United States Patent Office 2,846,409
Patented Aug. 5, 1958

2,846,409

FURFURYL ALCOHOL POLYMER-PROTEIN-LIGNOCELLULOSE PULPING LIQUOR COMPOSITIONS AND PROCESS OF MAKING THE SAME

Robert J. Herschler and Rainer G. Jaffe, Camas, and Francis O. Whipple, Washougal, Wash., assignors to Crown Zellerbach Corporation, San Francisco, Calif., a corporation of Nevada No Drawing. Application January 23, 1956
Serial No. 560,903

19 Claims. (Cl. 260—8)

The present invention relates to polymeric compositions obtained by combining as essential ingredients a benzene-soluble furfuryl alcohol polymer, an aqueous-alkali-soluble protein, and spent lignocellulose pulping liquor. The invention relates further to processes for making the foregoing compositions, which are useful as adhesives, as pigment retainers, in cellulosic pulp slurries, as binders for softboards, hardboards, and other composite woody products, as additives to paper pulp for improvement of the strength properties of paper produced therefrom, and as soil conditioners capable of retaining and slowly releasing polyvalent cations essential for plant growth.

Although the relative amount of constituents to be employed in formulating the herein described compositions may be varied to suit contemplated applications, Table I below sets forth the general and preferred ranges of proportions in percentages by weight, dry weight basis.

TABLE I

|  | General Range | Preferred Range |
|---|---|---|
| Benzene-soluble furfuryl alcohol polymer | 1–95 | 5–35 |
| Aqueous-alkali-soluble protein | 1–90 | 5–70 |
| Spent lignocellulose pulping liquor | 1–95 | 5–85 |

In addition, sufficient water may be included in the final composition to give it a desired viscosity for a given application, if a liquid composition is required.

The term "benzene-soluble furfuryl alcohol polymer" as used herein comprehends the polymers of furfuryl alcohol which may be produced by the self-condensation of furfuryl alcohol monomer in the presence of such catalysts as metals or acids. It also comprehends the copolymers produced by the copolymerization in the presence of metals, acids or other catalysts of furfuryl alcohol monomer, or intermediate furfuryl alcohol polymers, with formaldehyde, or with related compounds such as paraformaldehyde.

The polymerization reaction is carried out to the stage wherein the polymer may be partly or completely water insoluble but wherein it retains substantial solubility in benzene and similar aromatic hydrocarbon solvents.

Polymerization of the furfuryl alcohol to this state only is a requisite for the successful preparation of the herein described composition since if it is polymerized further it becomes non-reactive towards the protein which is another essential ingredient of the composition. It also becomes insoluble in benzene and the various organic solvents which may be required as solvents in applying it.

Although various procedures may be employed for preparing the above described benzene-soluble furfuryl alcohol polymers, the following are illustrative:

(A) One mole of furfuryl alcohol, one mole of formaldehyde (37% solution), and about 0.001 mole of phosphoric acid are heated together in a reaction vessel equipped with a water condenser for about 90 minutes at 90° C. The reaction product then is partly neutralized with sufficient sodium hydroxide solution to attain a pH of 4–5, cooled to 70° C., and dehydrated in vacuo.

(B) The same procedure is followed, but 0.5 mole in lieu of 1 mole of formaldehyde is used.

(C) One mole of furfuryl alcohol is heated together with 0.001–0.002 moles of phosphoric acid for about 90 minutes at 95° C., then neutralized and dehydrated as indicated hereinabove.

The term "aqueous-alkali-soluble protein" used herein comprehends those proteinaceous materials which are soluble in dilute aqueouse alkalies such as sodium hydroxide. It also comprehends those proteins normally classified as being water-soluble, since proteins soluble in water necessarily are soluble in dilute aqueous alkali.

Typical of the proteins which are soluble in both water and dilute aqueous alkali are fish glue; animal glue, including bone glue and hide glue; water-soluble blood. Exemplary of proteins which are soluble in dilute aqueous alkali are casein, soybean protein, zein, and the like. Preferred proteins for use in formulating the polymeric compositions of this invention are the fish and animal glues.

The term "lignocellulose pulping liquor" used herein denotes the spent liquors obtained as by-products from the chemical pulping by the sulfite, soda or sulfate processes of the various fibrous lignocellulosic plants such as the coniferous or deciduous trees, and of the non-woody plants such as straw or bagasse.

The spent liquor separated from the cellulosic pulp in these processes contains primarily lignin derivatives, i. e. the calcium, magnesium, ammonium, or sodium salts of the lignin sulfonic acids in the case of the sulfite pulping process; alkali lignin in the case of the soda process; and thiolignin in the case of the sulfate (kraft) process. It also contains varying but substantial proportions of reducing sugars and miscellaneous constituents including inorganic materials, waxes, fatty acids, sterols, and the like.

For the present purposes the pulping liquor may be used in its original concentration of about 8% by weight, in the form of concentrates wherein part of the water has been removed by evaporation and having a concentration of from 30–50% by weight, or in the form of a solid product wherein substantially all of the water has been removed by evaporation.

Although pulping liquor solids derived from any of the above described sources are suitable for use in the preparation of the compositions of this invention, it is preferred to use those derived from sulfite spent liquor. A particularly suitable representative of these is the product supplied by the Crown Zellerbach Corporation of San Francisco, California under the trademark Orzan. This product is available commercially in liquid or dry powdered form and has a wide range of solids content. The solids content of a typical grade of Orzan is 50% by weight and its pH value is 4.5.

Table II gives the general range and a typical example illustrating the proportions in percent by weight on a dry solids basis of the constituents present in a spent liquor containing about 10% solids by weight and resulting from the pulping of western hemlock by the ammonium base sulfite process.

TABLE II

|  | General Range | Typical Example |
|---|---|---|
| Lignin sulfonic acids | 40–70 | 55 |
| Alkali-liberated ammonia | 1–5 | 3 |
| Reducing sugars, as glucose | 10–30 | 17 |
| Miscellaneous | trace to 30% | 25 |

The polymeric compositions of the present invention may be prepared in a number of ways. Thus the furfuryl alcohol polymer may be combined with the protein and pulping liquor in an aqueous medium using a suitable mixer capable of producing a vigorous, high-shear mixing action.

If desired the furfuryl alcohol polymer may be pre-emulsified before blending with suitable emulsifying agents, such as polyvinyl alcohol, alginates, poly-acrylates, and the like. Such agents may be used in the form of their aqueous solutions or dispersions in an amount sufficient to produce a stable furfuryl alcohol polymer emulsion.

Another way of combining the liquid furfuryl alcohol polymer with the protein and the pulping liquor is to dissolve it first in an organic, aromatic solvent, such as benzene or toluene, and then to blend it with the other ingredients. Thereafter the solvent may be separated by any suitable method, as by stripping with steam.

It has been found, however, that in preparing the polymeric compositions of this invention by a preferred method, the furfuryl alcohol polymer may first be dissolved in and emulsified with a rosin soap. Such soaps are produced by heating rosin acids with sodium hydroxide or other basic sodium salts in an aqueous medium until a partially or completely saponified product is obtained. Depending on the ratio of alkali to rosin acids, the amount of unsaponified, or free rosin acids in the final product may vary from 0–90%, although the usual range in the commercially available rosin soaps is from 10–35% by weight. The solids content of commercial rosin soaps may range from 50% to about 96%, more commonly from 70–80% by weight.

Although the ratio of rosin soap to furfuryl alcohol polymer used in the herein described compositions may be as high as about 2:1, dry weight basis, we prefer to employ a rosin soap-furfuryl polymer ratio in the range of from 1.4:1 to 1.8:1, dry weight basis.

To dissolve the furfuryl alcohol polymer in the rosin soap, both materials are mixed together in the predetermined quantities and heated with stirring at a temperature in the range of from about 150° F. to 212° F., preferably between 160° F. and 200° F. until a homogeneous solution is obtained. The resulting solution then may be combined with the protein and the waste liquor, each employed as an aqueous solution.

Finely divided clay may be added to the herein described formulations if they are to be used as adhesives for such products as paper or linoleum, for the purpose of enhancing the adhesive properties of the formulation. Suitable clays for this purpose include fireclays, coating clays, ceramic clays, etc. in finely divided form.

As has been indicated above, water is still another component which may be included in the compositions of this invention. It may be added at any stage of the compounding procedure, or to the final compositions after they have been prepared. Normally it is included in the other raw materials, particularly the furfuryl alcohol polymer and the lignocellulose pulping liquor, where it is employed as a solvent or dispersion medium. Sufficient water is included to obtain a product having the desired viscosity. If desired, however, the product may be dried in vacuo or by other suitable techniques.

Although the nature of the reactions occurring during combination of the various constituents of our presently described compositions, are unknown to us, it is evident that a combination of the constituents occurs to form a new product which is stable over a relatively long period of time under ordinary room temperature conditions. This new product can not be separated into its original constituents by the methods conventionally employed for the separation of the components of a mere physical mixture.

The presently described polymeric compositions and various methods of their preparation are further illustrated in the following examples wherein the proportions of the ingredients are given in percentages by weight on a dry solids basis.

Example 1

This example illustrates a composition of the invention wherein the protein is present in major proportion.

| | |
|---|---|
| Benzene-soluble furfuryl alcohol polymer | 16.6 |
| Aqueous-alkali-soluble protein | 66.8 |
| Lignocellulose pulping liquor | 16.6 |

The furfuryl alcohol polymer was a partially polymerized, liquid, water-insoluble product having a viscosity of 600 centipoises at 25° C. It was supplied by the Quaker Oats Co. of Chicago, Illinois. The protein was a water-soluble, 67 jelly gram value animal glue used in the form of an aqueous solution containing 25% solids. The lignocellulose pulping liquor was an ammonium-base sulfite spent liquor having a solids content of 50% by weight and marketed by the Crown Zellerbach Corporation under the trademark Orzan.

The furfuryl alcohol polymer first was blended thoroughly with the Orzan at room temperature using a high-shear mixer, and then added slowly with stirring to the glue solution. The resulting mixture then was stirred until a homogeneous composition was produced.

This composition was suitable for use as an agglomerant of suspended particles in aqueous media when applied together with an acidic agent, such as aluminum sulfate.

Example 2

This example illustrates a composition of this invention wherein the lignocellulose pulping liquor is the major constituent.

| | |
|---|---|
| Benzene-soluble furfuryl alcohol polymer | 7.7 |
| Aqueous-alkali soluble protein | 23.1 |
| Lignocellulose pulping liquor | 69.2 |

The furfuryl alcohol polymer was a partially polymerized, liquid, water-insoluble product having a viscosity of 600 centipoises at 25° C. It was supplied by the Quaker Oats Company. The protein was a water-soluble 86 jelly gram value animal glue, used in the form of an aqueous solution having a 10% solids content. The lignocellulose pulping liquor was a calcium-base sulfite spent liquor having a solids content of about 50% by weight.

The ingredients were combined in the manner described in Example 1. The composition was suitable for use as a strength additive and a pigment retention aid when incorporated in a papermaking pulp slurry and precipitated on the fibers with an acidic agent, such as aluminum sulfate.

Example 3

| | |
|---|---|
| Benzene-soluble furfuryl alcohol polymer | 3 |
| Aqueous-alkali-soluble protein | 24 |
| Lignocellulose pulping liquor | 73 |

The furfuryl alcohol polymer and the lignocellulose pulping liquor were the same as used in Example 1. The protein was a water-soluble 192 jelly gram value animal glue, used in the form of an aqueous solution containing 25% solids by weight.

The components were combined in the same manner as set forth in Example 1. The homogeneous combination then was diluted with water to a 5% solids content by weight. The composition was highly satisfactory in retaining fibers in paper machine save-all aqueous systems, when incorporated therein together with an acidic agent, such as aluminum sulfate.

Example 4

This example illustrates a composition of this invention wherein the furfuryl alcohol polymer is dissolved in an organic aromatic solvent.

Benzene-soluble furfuryl alcohol polymer _____ 20
Aqueous-alkali-soluble protein _____ 40
Lignocellulose pulping liquor _____ 40

The furfuryl alcohol polymer was a partially polymerized, liquid, water-insoluble material, having the following specifications: specific gravity 1.235–1.245; index of refraction 1.538–1.539; pH at 50/50 with water 4.3–4.6; and viscosity at 25° C. 3000–4000 centipoises. It was supplied by the Durez Plastics & Chemicals, Inc., North Tonawanda, New York, under the designation "Durez 14410." The protein glue and lignocellulose pulping liquor were the same as in Example 1.

The furfuryl alcohol polymer was dissolved first in benzene, the proportions used being 2 parts furfuryl alcohol polymer to 1 part benzene. The resultant solution was then added to the glue solution with good stirring. The lignocellulose pulping liquor was added next and mixed until a uniform combination was obtained. The benzene was then removed by stripping with steam.

The final composition was satisfactory as a retention aid for pigments when added in form of a 5% aqueous solution to pigment-containing papermaking pulp aqueous slurry and acidified with a suitable agent, such as aluminum sulfate.

*Example 5*

This example illustrates a composition of this invention wherein the furfuryl alcohol polymer is pre-emulsified with an emulsifying agent.

Benzene-soluble furfuryl alcohol polymer _____ 28
Aqueous-alkali-soluble protein _____ 12
Lignocellulose pulping liquor _____ 60

The same furfuryl alcohol polymer as described in Example 4 was emulsified with an aqueous solution of sodium polyacrylate having a 15% solids content, the furfuryl alcohol/polyacrylate ratio being 7:1, solids basis respectively. The resulting emulsion was added with stirring to an aqueous solution of the protein, i. e. 500 jelly gram value animal glue having a 10% solids content by weight. A 50% solids content solution of the hereinabove described Orzan, was then added and the ingredients were mixed until a homogeneous combination was produced.

The composition was applicable as a binder for fibers in the manufacture of softboards and hardboards.

*Example 6*

This example illustrates a composition of this invention combined with a substantial proportion of clay.

Benzene-soluble furfuryl alcohol polymer _____ 8.3
Aqueous-alkali-soluble protein _____ 8.3
Lignocellulose pulping liquor _____ 83.4

The furfuryl alcohol polymer was the same as described in Example 4. The protein and the lignocellulose pulping liquor were the same as described in Example 1.

The aqueous solutions of glue and Orzan were mixed together, followed by incorporation therein with continuous stirring of finely divided Green Stripe fire clay, supplied by the Gladding, McBean Co., Seattle, Washington. The proportion of clay employed was 2 parts clay to 1 part Orzan solids by weight. The furfuryl alcohol polymer was then added to the resultant slurry and thoroughly mixed therewith by means of a high-shear mixer. The final product was highly satisfactory for use as an adhesive for paper, linoleum, etc.

*Example 7*

This example illustrates a composition of this invention and a preferred method of its preparation using rosin soap for dissolving the furfuryl alcohol polymer Benzene-soluble furfuryl alcohol polymer _____ 14
Aqueous-alkali-soluble protein _____ 43
Lignocellulose pulping liquor _____ 43

The furfuryl alcohol polymer was the same as used in Example 4, the protein was the same as used in Example 3, and the lignocellulose pulping liquor was the same as used in Example 2. The rosin soap was a dark rosin size having 80% solids content by weight, containing about 35% free rosin acids; and supplied by the Hercules Powder Co., Wilmington, Delaware.

The furfuryl alcohol polymer was first mixed with the rosin soap, the ratio of the rosin soap, dry weight basis, to the furfuryl alcohol polymer being 0.8:1. The mixture was heated with stirring to about 185° F. for a time sufficient to dissolve the furfuryl alcohol polymer. The resulting solution was then blended with an aqueous solution containing the protein and the lignocellulose pulping liquor.

The resulting combination diluted with water to about 5% solids content, was useful as an aid in improving size retention when incorporated together with an acidic agent, such as aluminum sulfate, in an unbleached papermaking pulp aqueous suspension.

*Example 8*

This example illustrates a composition of this invention which includes kraft lignocellulose pulping liquor, and wherein the furfuryl alcohol polymer is dissolved in a rosin soap.

Benzene-soluble furfuryl alcohol polymer _____ 14.3
Aqueous-alkali-soluble protein _____ 28.6
Lignocellulose pulping liquor _____ 57.1

The furfuryl alcohol polymer and the rosin soap were the same as used in Example 7. The protein was the same as used in Example 1, but used in the form of an aqueous solution containing 10% solids by weight. The lignocellulose pulping liquor was a kraft black liquor product, supplied by the West Virginia Pulp and Paper Co. under the designation "Indulin A" and employed in the form of an alkaline solution containing 50% solids by weight.

The furfuryl alcohol polymer was dissolved in the rosin soap in a similar manner to that described in Example 7. The rosin soap (solids basis)-furfuryl alcohol polymer ratio was, however, 1.6:1 by weight, respectively. The resulting solution was then combined with the aqueous solution containing the protein and the lignocellulose pulping liquor.

The final product, diluted with water to about 5% solids content, was suitable in increasing physical strength properties of paper when added to an unbleached kraft pulp aqueous slurry and precipitated on the fibers with aluminum sulfate at a pH of about 5.

*Example 9*

This example illustrates a composition of this invention which includes soyabean protein, and wherein the furfuryl alcohol polymer is first dissolved in a rosin soap.

Benzene-soluble furfuryl alcohol polymer _____ 16.6
Aqueous-alkali-soluble protein _____ 16.6
Lignocellulose pulping liquor _____ 66.8

The furfuryl alcohol polymer and the rosin soap were the same as were used in Example 7. The protein was a soya protein solution prepared by cooking the protein at 180° F. for 30 minutes with a 0.7% sodium hydroxide aqueous solution, the ratio of sodium hydroxide to protein by weight being 3.5:100. The lignocellulose pulping liquor was the same as described in Example 1.

The solutions of the protein and of the lignocellulose pulping liquor were combined, and the furfuryl alcohol polymer, dissoved in the same manner as set forth in Example 8, was combined therewith with efficient stirring.

The final combination, diluted with water to about 2% solids content, was suitable in increasing the strength properties of paper when incorporated in an unbleached kraft pulp aqueous slurry and precipitated on the fibers with a 50/50 aluminum sulfate-hydrochloric acid mixture at a pH of 4.5.

*Example 10*

This example illustrates another composition of this invention which contains a major proportion of the furfuryl alcohol polymer dissolved in a rosin soap.

| | |
|---|---|
| Benzene-soluble furfuryl alcohol polymer | 80 |
| Aqueous-alkali-soluble protein | 10 |
| Lignocellulose pulping liquor | 10 |

The furfuryl alcohol polymer and the rosin soap were the same as described in Example 7. The protein was the same as described in Example 1, but used in the form of an aqueous solution containing 10% solids by weight. The lignocellulose pulping liquor was the same as used in Example 2.

The protein solution and the lignocellulose pulping liquor were combined. The furfuryl alcohol polymer was dissoved in the rosin soap in the same manner as described in Example 7, except for the rosin soap/furfuryl alcohol ratio, which was 1.2:1 by weight, respectively. The two solutions were then combined.

The resulting polymeric combination was suitable for use as a binder in the manufacture of hardboard by spraying it onto the wood fibers, followed by acidification of the treated fibers with an acid or acid salt prior to their hot-pressing into a final board.

*Example 11*

This example illustrates a composition of this invention containing a low proportion of the protein and a modified sulfite spent liquor product.

| | |
|---|---|
| Benzene-soluble furfuryl alcohol polymer | 47 |
| Aqueous-alkali-soluble protein | 6 |
| Lignocellulose pulping liquor | 47 |

The furfuryl alcohol polymer solution and its ratio to rosin soap were the same as described in Example 7. The protein was the same as described in Example 3, but used in the form of a 10% solids content solution. The lignocellulose pulping liquor was a 50% aqueous solution of the hereinabove described Orzan, to which sufficient sodium hydroxide was added to raise its pH value to 7.

The furfuryl alcohol polymer dissolved in the rosin soap was mixed first with the lignocellulose pulping liquor solution. The protein solution was then added and mixed until a uniform product was formed.

The resulting composition was suitable as a binder for lignocellulose fibers in the manufacture of fiberboards, when used together with an acidic catalyst prior to the hot-pressing operation.

It will be apparent from the above examples that the novel polymeric compositions described herein are useful in a wide variety of applications. It is to be understood, however, that the present invention is not limited to disclosure of the examples, but that various modifications may be made without departing from the spirit of the invention as defined in the appended claims.

We claim:

1. A polymeric composition comprising the combination product of from 1–95% of a benzene-soluble furfuryl alcohol polymer comprising at least one member of the group consisting of the homopolymers of furfuryl alcohol and the copolymers thereof with formaldehyde; from 1–90% of an aqueous-alkali-soluble protein comprising at least one member of the class consisting of fish glue, animal glue, water-soluble blood, casein, soya bean protein and zein and from 1–95% of spent lignocellulose pulping liquor, percent being expressed as percent by weight on a dry weight basis.

2. The composition of claim 1 wherein the benzene-soluble furfuryl alcohol polymer is substantially water-insoluble.

3. The composition of claim 1 wherein the benzene-soluble furfuryl alcohol polymer comprises a homopolymer of furfuryl alcohol.

4. The composition of claim 1 wherein the benzene-soluble furfuryl alcohol polymer comprises a copolymer of furfuryl alcohol and formaldehyde.

5. The composition of claim 1 wherein the aqueous-alkali-soluble protein is also soluble in water.

6. The composition of claim 1 wherein the aqueous-alkali-soluble protein is a water-soluble animal glue.

7. The composition of claim 1 wherein the protein comprises bone glue.

8. The composition of claim 1 wherein the protein comprises hide glue.

9. The composition of claim 1 wherein the lignocellulose pulping liquor comprises sulfite spent liquor.

10. The composition of claim 1 wherein the spent lignocellulose pulping liquor comprises ammonium ligninsulfonates.

11. A polymeric composition comprising the combination product of from 5–35% of a benzene-soluble furfuryl alcohol polymer comprising at least one member of the group consisting of the homopolymers of furfuryl alcohol and the copolymers thereof with formaldehyde; from 5–70% of an aqueous-alkali-soluble protein comprising at least one member of the class consisting of fish glue, animal glue, water-soluble blood, casein, soya bean protein and zein and from 5–85% spent lignocellulose pulping liquor, percent being expressed as percent by weight on a dry weight basis.

12. A polymeric composition comprising the combination product of from 1–95% of a benzene-soluble furfuryl alcohol polymer comprising at least one member of the group consisting of the homopolymers of furfuryl alcohol and the copolymers thereof with formaldehyde; from 1–90% of a water-soluble protein comprising at least one member of the class consisting of fish glue, animal glue, water-soluble blood, casein, soya bean protein and zein; and from 1–95% of a water-soluble sulfite spent liquor, percent being expressed as percent by weight on a dry weight basis.

13. A polymeric composition comprising the combination product of from 5–35% of a benzene-soluble furfuryl alcohol polymer comprising at least one member of the group consisting of the homopolymers of furfuryl alcohol and the copolymers thereof with formaldehyde; from 5–70% of a water-soluble protein comprising at least one member of the class consisting of fish glue, animal glue, water-soluble blood, casein, soya bean protein and zein; and from 5–85% of a water-soluble sulfite spent liquor, percent being expressed as percent by weight on a dry weight basis.

14. The composition of claim 13 wherein the protein comprises animal glue.

15. A polymeric composition comprising the combination product of from 1–95% of a benzene-soluble furfuryl alcohol polymer substantially dissolved in a rosin soap and comprising at least one member of the group consisting of the homopolymers of furfuryl alcohol and the copolymers thereof with formaldehyde, from 1–90% of an aqueous-alkali-soluble protein comprising at least one member of the class consisting of fish glue, animal glue, water-soluble blood, casein, soya bean protein and zein, and from 1–95% spent lignocellulose pulping liquor, percent being expressed as percent by weight on a dry weight basis.

16. The composition of claim 15 wherein the ratio of rosin soap to furfuryl alcohol polymer is from 0.8:1 to 2:1.

17. A process of producing a polymeric composition which comprises heating a rosin soap and a benzene-soluble furfuryl alcohol polymer comprising at least one member of the group consisting of the homopolymers of furfuryl alcohol and the copolymers thereof with formaldehyde, in an aqueous medium, at a temperature not higher than about 212° F., until the furfuryl alcohol polymer is substantially dissolved in the rosin soap; forming a mixture of the resulting solution with an aqueous-alkali-soluble protein comprising at least one member of the class consisting of fish glue, animal glue, water-soluble blood, casein, soya bean protein and zein, and with spent lignocellulose pulping liquor; the mixture containing from 1–95% by weight of the furfuryl alcohol polymer, from 1–90% by weight of the protein and from 1–95% by weight of the liquor, dry weight basis; and agitating the mixture until a substantially homogeneous combination product is produced.

18. A process of producing a polymeric composition which comprises dissolving in an aromatic hydrocarbon solvent a benzene-soluble furfuryl alcohol polymer comprising at least one member of the group consisting of the homopolymers of furfuryl alcohol and the copolymers thereof with formaldehyde, forming a mixture of the resulting solution with an aqueous solution of an aqueous-alkali-soluble protein comprising at least one member of the class consisting of fish glue, animal glue, water-soluble blood, casein, soya bean protein and zein and with an aqueous solution of spent lignocellulose pulping liquor, the mixture containing from 1–95% by weight of the furfuryl alcohol polymer, from 1–90% by weight of the protein, and from 1–95% by weight of the liquor; separating the aromatic hydrocarbon solvent from the mixture; and agitating the residual components of the mixture until a substantially homogeneous polymeric composition is produced.

19. A process of producing a polymeric composition which comprises vigorously mixing together in an aqueous medium from 1–95% by weight of a benzene-soluble furfuryl alcohol polymer comprising at least one member of the group consisting of the homopolymers of furfuryl alcohol and the copolymers thereof with formaldehyde, from 1–90% by weight of an aqueous-alkali-soluble protein comprising at least one member of the class consisting of fish glue, animal glue, water-soluble blood, casein, soya bean protein and zein, and from 1–95% by weight of spent lignocellulose pulping liquor until a substantially homogeneous combination product is produced.

References Cited in the file of this patent
UNITED STATES PATENTS

| | | |
|---|---|---|
| 2,343,972 | Harvey | Mar. 14, 1944 |
| 2,355,180 | Becker | Aug. 8, 1944 |
| 2,494,545 | Evans et al. | Jan. 17, 1950 |

OTHER REFERENCES

Martin: "The Chemistry of Phenolic Resins," published by Wiley and Sons, New York, 1956, page 150.